(12) United States Patent
Gaillard et al.

(10) Patent No.: US 8,216,360 B2
(45) Date of Patent: Jul. 10, 2012

(54) GYPSUM BUILDING BOARDS

(75) Inventors: Nathalie Agnes Gaillard, Paris (FR); Emmanuel Henri Constant Geeraert, Kapellen (BE)

(73) Assignee: BPB Ltd., Coventry, England (GB)

( * ) Notice: Subject to any disclaimer, the term of this patent is extended or adjusted under 35 U.S.C. 154(b) by 0 days.

(21) Appl. No.: 12/438,951

(22) PCT Filed: Aug. 28, 2007

(86) PCT No.: PCT/GB2007/050508
§ 371 (c)(1),
(2), (4) Date: Aug. 4, 2009

(87) PCT Pub. No.: WO2008/026006
PCT Pub. Date: Mar. 6, 2008

(65) Prior Publication Data
US 2010/0043674 A1 Feb. 25, 2010

(30) Foreign Application Priority Data
Aug. 29, 2006 (GB) .................................. 0616091.5

(51) Int. Cl.
*C04B 11/00* (2006.01)
(52) U.S. Cl. .......... 106/772; 106/778; 428/703; 156/39; 264/333
(58) Field of Classification Search .................. 106/772, 106/778; 428/703; 156/39; 264/333
See application file for complete search history.

(56) References Cited

U.S. PATENT DOCUMENTS
| 5,714,001 A | 2/1998 | Savoly et al. |
| 2003/0084980 A1 | 5/2003 | Seufert et al. |
| 2003/0118803 A1 | 6/2003 | Veeramasuneni et al. |

FOREIGN PATENT DOCUMENTS
| WO | WO 97/04057 A | 2/1997 |
| WO | WO 99/35103 A | 7/1999 |
| WO | WO 01/81264 A | 11/2001 |
| WO | WO 02/12141 A | 2/2002 |

OTHER PUBLICATIONS

Author: Dr. P.M. Campbell Alternatives to Nonylphenol Ethoxylates Review of Toxicity, Biodegradation, http://www.c2p2online.com/documents/FinalNPEAlternativesPublicReport.pdf.
"Alternatives to Nonylphenol Ethoxylates," article from http://www.c2p2online.com/documents/FinalNPEAlternativesPublicReport.pdf> retrieved on Dec. 3, 2007, Vancouver.
Third Party Observations filed in European Application No. 07789383 (the European counterpart of the instant application) on Jan. 27, 2012 and English translation thereof.

*Primary Examiner* — Paul Marcantoni
(74) *Attorney, Agent, or Firm* — GrayRobinson, P.A.; Michael J. Colitz, III

(57) ABSTRACT

A method of producing gypsum building board, comprises allowing a layer of an aqueous gypsum slurry to set so as to form a board, in which the improvement comprises mixing the gypsum slurry with an aqueous foam produced by foaming water containing at least one non-ionic alkylpolysaccharide foaming agent of the general formula (I)

$$R\text{—}O\text{-}(G)x \qquad (I)$$

where: R represents a linear or branched alkyl group having from 6 to 20 carbon atoms; G represents a reducing saccharide moiety connected to R via an ethereal O-glycosidical bond; and x is 1 to 10.

24 Claims, 1 Drawing Sheet

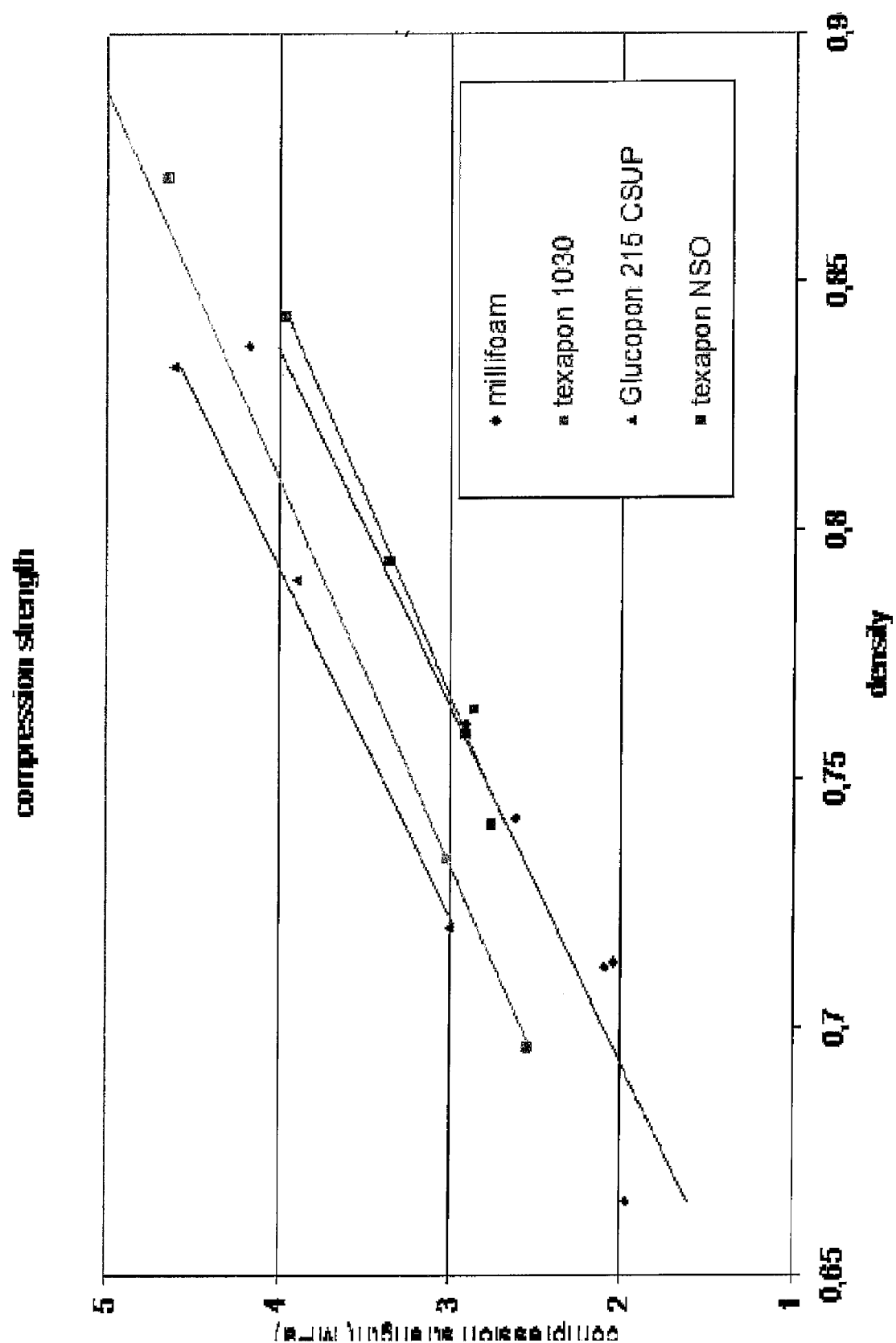

GYPSUM BUILDING BOARDS

PRIORITY DATA

This application is a continuation of and claims priority under 35 U.S.C. §371 to International Application No. PCT/GB07/050,508 filed on Aug. 28, 2007 and GB App. 0616091.5 filed on Aug. 29, 2006. The contents of both these applications are fully incorporated herein by reference.

The present invention concerns the production of gypsum building boards. These boards can be surface reinforced, such as plasterboard which is reinforced with paper liners or gypsum boards that are reinforced at or near the surface by a woven or non-woven reinforcement, or solely core reinforced.

Gypsum board is generally produced by shaping gypsum stucco slurry, which may contain fibre reinforcement, through an extruder or between rollers or belts. For surface reinforced gypsum board, the gypsum slurry is sandwiched between surface reinforcements before shaping. In this arrangement, the edges of the surface reinforcement or liner sheets are typically sealed together. After shaping of the gypsum board, the wet slurry is allowed to set and the set board is cut into desired lengths and dried to form the final board.

Conventionally, a pre-generated aqueous foam is added to the slurry so as to reduce the weight of the resulting final board. Various types of foaming agent are known for use in the gypsum slurry, amongst these being ionic surfactants such as sodium alkyl ether sulfates of the formula $C_nH_{2n+1}(C_2H_4O)_pSO_4Na$, in which n is 5 to 22 and p is typically up to 4, or their ammonium analogues, or the corresponding alkyl sulfates in which p is 0.

The present invention provides a method of producing gypsum building board having enhanced properties, in which there is added to the gypsum slurry an aqueous foam produced by foaming water containing at least one non-ionic alkylpolysaccharide foaming agent of the general formula (I)

$$R\text{—}O\text{-}(G)_x \qquad (I)$$

where: R is a linear or branched alkyl group having from 6 to 20 carbon atoms (preferably 8 to 18 carbon atoms);

G is a reducing saccharide moiety connected to R via an ethereal O-glycosidical bond; and x (which represents the degree of oligomerisation of the polysaccharide) is 1 to 10 (preferably 1 to 3).

The resulting board is lighter because it contains air bubbles as a result of mixing the gypsum slurry with the aqueous foam; the board produced according to the invention has improved compressive strength relative to board made from foams containing known foaming agents.

In the above general formula, R preferably has 8 to 18 carbon atoms; 8 to 14 are preferred.

Preferably, G is a glucose moiety, such that the alkylpolysaccharide is preferably an alkylpolyglucoside. Other saccharide units may, however, be substituted for one or more of the glucose units; suitable such saccharide units include maltose, arabinose, xylose, sucrose, fructose, lactose and the like.

Such alkylpolyglucosides are commercially available and known for other purposes, such as in cleaning preparations.

Preferably, the alkylpolysaccharide foaming agent is present in the aqueous foam in an amount not exceeding 1% active basis based on the weight of the foam, a preferred amount being from 0.1% to 0.6%.

It may sometimes be appropriate to include one or more foaming agents in addition to the non-ionic alkylpolysaccharide foaming agent of formula (I).

Alkylpolysaccharides may be produced by processing fatty alcohols and sugars such as glucose, typically in a molar ratio of 3:1 to 10:1 at elevated temperatures (such as 90° to 120° C.) in an acid-catalyzed etherification reaction, generally followed by a condensation reaction.

The water from which the aqueous foam is made is typically ground water or tap water, which may have been filtered. Other non-deleterious materials, adjuvants and ingredients may, when appropriate, be present in the water from which the foam is made.

The foam is typically made by mechanically whipping the water containing the alkylpolysaccharide using appropriate whipping blades. Because the foam is inherently unstable, it is preferably mixed with the slurry shortly after whipping, typically in a continuous process so that whipped foam is continuously prepared and mixed with the gypsum slurry The gypsum slurry which is mixed with the whipped aqueous foam comprises hydratable gypsum (calcium sulfate), which has generally been obtained by gypsum calcination. The slurry may contain other non-deleterious mineral materials and/or ions such as phosphate and/or magnesium ions. The hydratable calcium sulfate may be, for example, anhydrous calcium sulfate (anhydrite II or III) or a calcium sulfate hemihydrate ($CaSO_4.0.5H_2O$) in its alpha- or beta-crystalline form.

The gypsum is typically mixed with water to form a slurry before mixing with the aqueous foam described above; the water from which the slurry is made is typically ground water or tap water, which may have been filtered. Other non-deleterious materials, adjuvants and ingredients may, when appropriate, be present in the water from which the slurry is made.

The pH of the slurry is typically in the range 6.5 to 9.5, and the slurry may contain optional further ingredients, such as starch, water reducing agents, moisture repellents (such as silicone oils or waxes), reinforcing fibres, set accelerators and retarders, deformation inhibitors (such as anti-sagging agents), anti-shrink additives, recalcination inhibitors, foam stabilisers, levelling aids, bactericides, fungicides, pH adjusters, colouring agents, fire retardants and fillers (such as particulate mineral material or plastics, which may in some embodiments be in expanded form).

In the production of gypsum board according to the invention, the slurry may contain fibre reinforcement, such as glass fibres (typically cut fibres). The gypsum board produced according to the invention may be with or without surface reinforcement or liner sheets; when surface reinforcement is used, it may, for example, be of fibre scrim or fibre mesh.

The aqueous foam is typically mixed with the slurry in an amount such that the foaming agent is present in the mix in an amount between 1 and 10 gram per square metre in a board of standard thickness (about half an inch or 12.5 mm).

When gypsum building board is produced according to the invention, it is preferably formed to a desired thickness by extrusion or pressing between rollers or belts.

The present invention extends to gypsum building board comprising a set aqueous gypsum slurry containing an alkyl polysaccharide foaming agent as defined above, and the use of such an alkyl polysaccharide foaming agent in the production of such gypsum building board.

Certain aspects and features of the present invention are illustrated by the following worked examples.

EXAMPLES

1. Various foaming agents were diluted with 200 ml water to obtain a solution having a concentration of about 0.30% by weight, active basis. The solution was whipped with a perforated Rayneri blade at 2500 rpm for 2 minutes, to produce a thick white foam.

2. In parallel, 1 kg gypsum plaster with 4.7 g starch and 0.1 g PlastRetard retardant was poured into 670 g tap water at about 15° C., under shear at 1500 rpm for 20 seconds. The foam described in the previous paragraph was introduced (within one minute of being prepared) into the mix using a spoon, and then stirred at 1000 rpm for the next 40 seconds. The weight of the foam introduced was monitored to thereby control the amount of foaming agent introduced 3. The resulting slurry was poured into polystyrene moulds in the shape of prisms measuring approximately 4 cm×4 cm×16 cm, the slurry was then allowed to set. The resultant prisms were then dried to constant weight at about 40° C. for about 48 hours. The flexion and compressive strengths of the resulting blocks, as well as their densities, were measured.

Several samples were prepared with varying amount of the introduced foam, with several foaming agents, as follows:

Millifoam C (comparative)—this is a sodium alkyl ether sulfate commercially available from Huntsman, of the formula $C_nH_{2n+1}(C_2H_4O)_pSO_4Na$, in which n is 10 to 12, p is about 2.5.

Texapon NSO (comparative)—this is a sodium laurylether sulfate commercially available from Cognis, of the formula $C_nH2n+1(C_2H_4O)pSO_4Na$, in which n is 12, p is about 2.5.

Polystep B25 (comparative)—this is a sodium alkyl sulfate which is commercially available from Stepan, of the formula $C_nH_{2n+1}SO_4Na$, in which n is 10 to 12.

Texapon 1030 (comparative)—this is a sodium decyl sulfate which is commercially available from Cognis, of the formula $C_nH_{2n+1}SO_4Na$, in which n is 10.

Glucopon 215 (according to the invention)—this is an alkyl polyglucoside commercially available from Cognis, of the formula $C_nH_{2n+1}$—O-$(G)_x$ in which n is 8 to 10, x is 1.5 and G is a glucose moiety connected by means of an ethereal O-glycosidical bond:

A large range of sample densities was covered. The following table summarises the values obtained with the above four surfactants. The results indicate that a surprisingly greater compressive strength is obtained using the alkyl polyglucoside according to the invention than for comparable densities using conventional foaming agents. For example, using Millifoam C, the compressive strength is 2.1 MPa with a density of 0.71 g/cm³ and 2.62 MPa with a density of 0.74 g/cm³, whereas using Glucopon 215 according to the invention, the compressive strength is 3 MPa with a density of 0.72 g/cm³.

| Surfactant | Density g/cm 3 | Compressive strength MPa |
|---|---|---|
| Millifoam C | 0.71 | 2.1 |
| | 0.74 | 2.6 |
| | 0.76 | 2.9 |
| | 0.83 | 4.2 |
| Glucopon 215 | 0.72 | 3 |
| | 0.79 | 3.9 |
| | 0.83 | 4.6 |
| Texapon 1030 | 0.70 | 2.5 |
| | 0.73 | 3 |
| Polystep B25 | 0.71 | 2.7 |
| | 0.75 | 3.3 |

Further results are summarised in the attached graph of compression strength versus density.

For similar core density the use of alkylpolysaccharides according to the invention allows the achievement of higher mechanical performance compared to standard surfactant. This can enable the core to be made lighter with the use of alkylpolysaccharides according to the invention without detriment to mechanical properties.

Although this example shows use of the aqueous foams in plaster blocks, it is envisaged that comparable advantages would be obtained if the slurry is sandwiched between opposed surface reinforcement or liner sheets to form a plasterboard.

What is claimed is:

1. A method of producing gypsum building board, which method comprises producing an aqueous foam by:
    whipping water containing a foaming agent to produce an aqueous foam;
    mixing the aqueous foam with an aqueous gypsum slurry; and
    allowing a layer of the resulting mix to set so as to form a gypsum building board;
    characterized in that the foaming agent is at least one non-ionic alkylpolysaccharide foaming agent of the general formula (I)

R—O-(G)x  (I)

where: R represents a linear or branched alkyl group having from 6 to 20 carbon atoms; G represents a reducing saccharide moiety connected to R via an ethereal O-glycosidical bond; and x is 1 to 10, said foaming agent being present in an amount to enhance the compressive strength of the gypsum building board.

2. A method according to claim 1, wherein G represents at least one glucose moiety.

3. A method according to claim 1, wherein R has 8 to 18 carbon atoms.

4. A method according to claim 2, wherein R has 8 to 18 carbon atoms.

5. A method according to claim 1, wherein the alkylpolysaccharide foaming agent is present in the aqueous foam in an amount not exceeding 1% active basis based on the weight of the foam.

6. A method according to claim 1, wherein the slurry is fed between spaced surface reinforcements so as to form a sandwich structure and the slurry is allowed to set between the surface reinforcements.

7. A method according to claim 1, wherein the slurry contains fibre reinforcement.

8. A method according to claim 1, wherein the gypsum slurry contains starch.

9. Gypsum building board when produced by a method according to claim 1.

10. Gypsum building board when produced by a method according to claim 2.

11. Gypsum building board when produced by a method according to claim 3.

12. Gypsum building board when produced by a method according to claim 4.

13. Gypsum building board when produced by a method according to claim 5.

14. Gypsum building board when produced by a method according to claim 6.

15. Gypsum building board when produced by a method according to claim 7.

16. Gypsum building board when produced by a method according to claim 8.

17. Gypsum building board comprising a set aqueous slurry foamed using a foaming agent comprising at least one non-ionic alkylpolysaccharide foaming agent as defined in claim 1.

18. Gypsum building board comprising a set aqueous slurry foamed using a foaming agent comprising at least one non-ionic alkylpolysaccharide foaming agent as defined in claim 2.

19. Gypsum building, board comprising a set aqueous slurry foamed using a foaming agent comprising at least one non-ionic alkylpolysaccharide foaming agent as defined in claim 3.

20. Gypsum building board comprising a set aqueous slurry foamed using a foaming agent comprising at least one non-ionic alkylpolysaccharide foaming agent as defined in claim 4.

21. A method of using a foaming surfactant for enhancing the compressive strength of gypsum building board, the surfactant comprising at least one non-ionic alkylpolysaccharide foaming agent as defined in claim 1, to be added to a gypsum slurry as an aqueous foam.

22. A method of using a foaming surfactant for enhancing the compressive strength of gypsum building board, the surfactant comprising at least one non-ionic alkylpolysaccharide foaming agent as defined in claim 2, to be added to a gypsum slurry as an aqueous foam.

23. A method of using a foaming surfactant for enhancing the compressive strength of gypsum building board, the surfactant comprising at least one non-ionic alkylpolysaccharide foaming agent as defined in claim 3, to be added to a gypsum slurry as an aqueous foam.

24. A method of using a foaming surfactant for enhancing the compressive strength of gypsum building board, the surfactant comprising at least one non-ionic alkylpolysaccharide foaming agent as defined in claim 4, to be added to a gypsum slurry as an aqueous foam.

\* \* \* \* \*